Jan. 9, 1968  O. B. McREYNOLDS, JR  3,362,478
BRIDGE PLUGS
Filed April 11, 1966
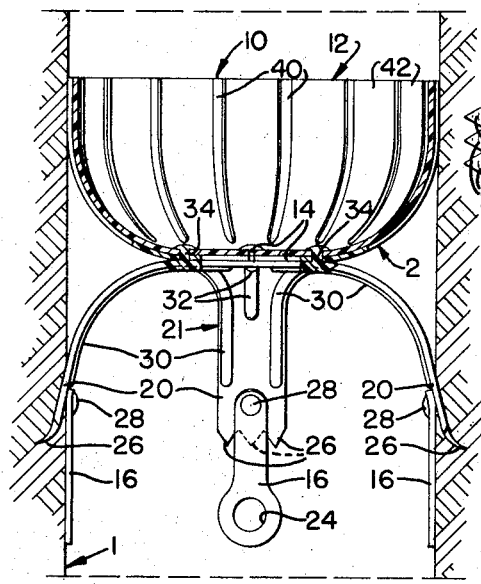
Fig. 1
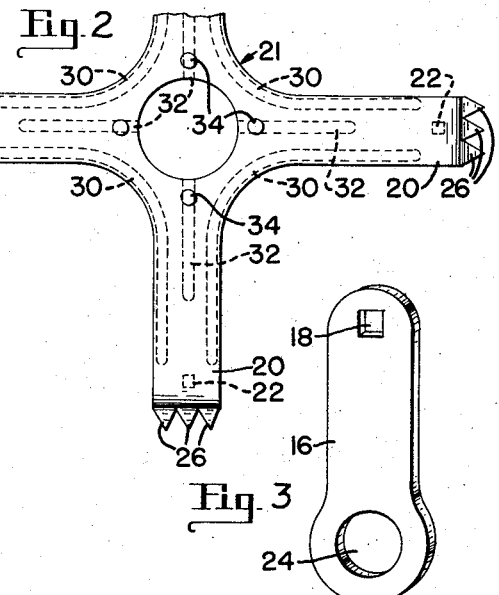
Fig. 2
Fig. 3
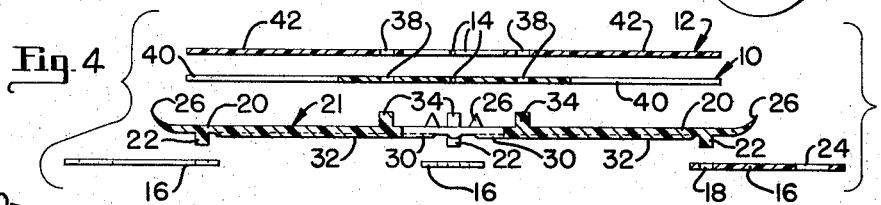
Fig. 4
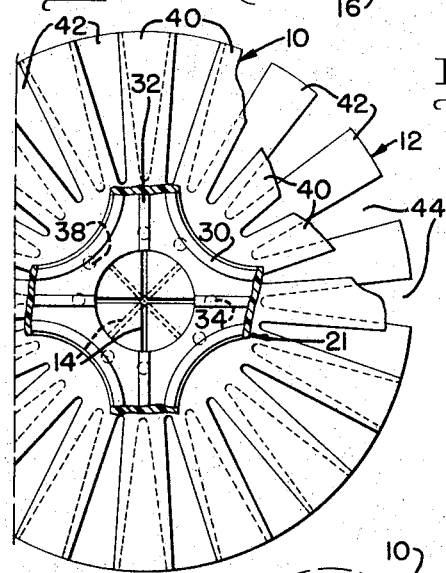
Fig. 5
Fig. 6
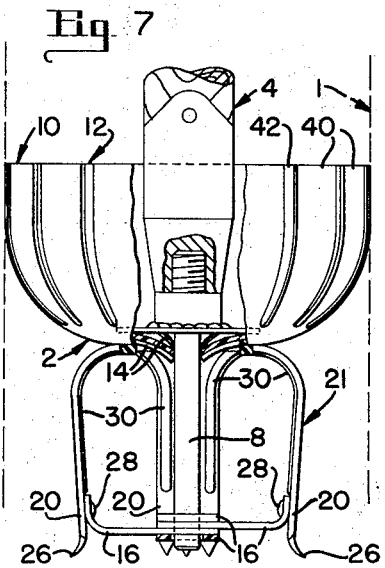
Fig. 7
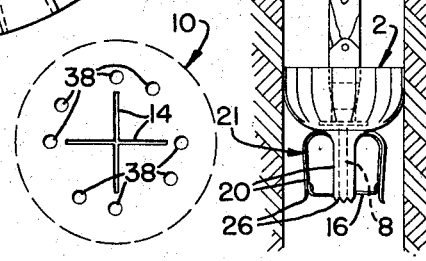
Fig. 8
INVENTOR.
OLIVER B. McREYNOLDS JR.
BY
Wayland D. Keith
HIS AGENT

United States Patent Office
3,362,478
Patented Jan. 9, 1968

3,362,478
BRIDGE PLUGS
Oliver B. McReynolds, Jr., P.O. Box 1235,
Palestine, Tex. 75801
Filed Apr. 11, 1966, Ser. No. 541,600
10 Claims. (Cl. 166—123)

This invention relates to a bridge plug to be used for closing the bore hole of a well to prevent surface erosion, or to establish a bridge at any desired depth in the bore hole, which bore hole may have been drilled for geophysical or geological exploration.

Various methods have been used heretofore to plug or to close exploration bore holes, after they have served their purpose, but these methods have been inadequate in many instances, in that if the plug was set in the bore hole in such manner as to close the bore hole against erosion, encroachment of water, or the like, it was often impossible to remove such plug in order to re-enter the hole, if it became desirable to use the hole again for geophysical or geological exploration. If the plug was such that it could be readily removed for re-entry into the hole, it often collapsed, thereby allowing water to enter the hole, which could cause the caving thereof; therefore, the exploration bore hole, which may have cost from hundreds to thousands of dollars to drill, would be lost.

The present plug is so designed that it may be seated at the desired depth in the hole, to close the bore hole so it may be filled to prevent encroachment of water, but still enable the plug to be readily removed, and the hole to be salvaged without damage thereto.

An object of this invention is to provide a bridge plug for the bore hole of a well, which plug will close the bore hole in such manner as to hold a bridge of earthen material or the like therein, so surface erosion will not result, but which will maintain the bore hole in re-usable condition over a long period of time.

Another object of the invention is to provide a bridge plug for closing the bore hole of a well, which plug is light in weight, and which may be readily deformed, from a substantially disc-like member to a cup-like member, so it may be run into the well, which plug is low in cost of manufacture.

A further object of the invention is to provide a bridge plug for bore holes, which plug may be made of a material which does not deteriorate when buried in the earth for a long period of time, but which is light and strong, but which is resistant to erosion.

Still another object of the invention is to provide a bridge plug which may be collapsed to be packed in a minimum space for storage or for shipment, which may be expeditiously run into a bore hole, to be anchored at any given place therein, where it will stay in set position under most operating conditions.

Yet another object of the invention is to provide a bridge plug for a bore hole, which plug may be readily removed by a bridge plug removal tool, with a minimum of damage to the bore hole, and the bore hole will be left in such condition that the bridge plug may be re-run thereinto to close the bore hole, when desired.

A further object of the invention is to supply a nonmetallic, inexpensive, durable, compact unit with which to plug exploration bore holes at any desired depth therein so as to prevent encroachment of water into the bore hole, and to prevent erosion of the surface of the earth which surrounds the bore hole.

Still a further object of the invention is to fabricate a bridge plug of mating parts of plastic material, which is light in weight, inexpensive to manufacture, and which is so compact that a quantity of such plugs may be stored in a minimum of space for transportation, to be used in seismic exploration and in other types of geological exploration.

Another object of the invention is to provide a bridge plug which is simple in construction, easy to set with a minimum of effort, so as to close the bore hole of a well in a permanent manner.

Yet a further object of the invention is to provide a plastic bridge plug for a bore hole, which plug is readily drillable for re-entry into the plugged bore hole, should this become necessary or desirable.

Another object of the invention is to supply an inexpensive plastic bridge plug which requires no adjusting or modification in order for one plug to fit exploration bore holes in a wide range of sizes, which plug will securely close the hole to enable an earthen bridge to be formed thereon.

With these objects in mind and others which will become manifest as the description proceeds, reference is to be had to the accompanying drawings, in which like reference characters designate like parts in the several views thereof, in which:

FIG. 1 is a vertical sectional view through a portion of a bore hole, showing a bridge plug therein in "set" position, with a portion of the bridge plug being shown in section and a portion thereof being shown in elevation;

FIG. 2 is an enlarged, fragmentary top view of a portion of the tines which hold the bridge plug in supported relation in the bore hole of a well, which tines are shown apart from the bridge plug;

FIG. 3 is an enlarged, fragmentary, perspective view of one of the tine retaining members, shown apart from the tines;

FIG. 4 is an exploded, longitudinal sectional view through the bridge plug, showing the relationship of the parts, prior to the assembly thereof;

FIG. 5 is a fragmentary, bottom plan view of the bridge plug, with portions being broken away, and with portions being shown in section to bring out the details of construction;

FIG. 6 is a longitudinal, sectional view through a portion of a bore hole, showing a bridge plug being run thereinto, with a setting tool, the tines of the bridge plug being shown as held in retracted position, and showing the bridge plug and setting tool in elevation, with portions being broken away and with portions shortened to bring out the details of construction;

FIG. 7 is an elevational view, partly in section and with parts broken away, of a bridge plug and the lower end of the bridge plug setting tool which holds the tines in retracted position, and showing a bore hole of a well in dashed outline; and FIG. 8 is a fragmentary portion of one of the disc-like members of the bridge plug, shown apart from the rest of the mechanism to show the relative spacing of holes to enable the upper and lower disc-like elements to be used interchangeably.

The present bridge plug is an improvement on my bridge plug disclosed in Patent No. 3,126,827, issued Mar. 31, 1964, which present bridge plug has certain salient features that make this plug easier to manufacture, to assemble and to run into the bore hole of a well, and furthermore, this plug is so constructed that it seals a bore hole in tight relation and supports the load thereon until it is desired to remove or drill out the plug.

With more specific reference to the drawings, the numeral 1 designates a bore hole in which the bridge plug, designated generally by the numeral 2, is run on a bridge plug setting tool generally designated by the numeral 4. The tool 4 is preferably connected together by connectors 6, which has been fully brought out in the above-mentioned patent, and which bridge plug setting tool has a spear 8 on the lower end thereof, which spear passes centrally down through the center portion of the serrated plastic discs 10 and 12, so that the spear 8 will pass through slits 14 formed in the respective discs, the plastic of which is deformed, as shown in FIG. 7, which will enable the bridge plug 2 to be moved to the desired depth in the bore hole, as indicated in FIGS. 6 and 7. Upon the plug reaching the desired depth, the plug setting tool 4 is moved upward and the spear 8 will move upward to release apertured retaining lugs 16, one end of each lug 16 has a squared aperture 18 formed therein. Each retaining lug 16 is attached near the outer end of the respective tines 20 by a squared, plastic rivet 22, so as to maintain the apertured retaining lugs in fixed position to extend generally in the same direction as the respective tines 20.

Each of the retaining lugs 16 has a comparatively large aperture 24 formed therein in position to loop over the central spear 8, when the spear is in the position as shown in FIGS. 6 and 7, so as to maintain the tines 20 in retracted position.

Each of the tines 20 is sharpened, and each has teeth 26 formed on the respective distal ends thereof, to engage within the wall of the bore hole 1, until retaining lugs 16 move into engagement with the surface of the bore hole 1. The retaining lugs 16 are riveted, preferably by thermo-forming of the outwardly extending, squared rivets 22 so as to form a head 28, so the squared apertures 18 will fit over the squared rivet 22 to maintain each of the retaining lugs 16 in a fixed relation with respect to the tines 20.

It is preferable to have all the component parts of the bridge plug made of thermo-plastic, so that the various components may be readily heated, so these elements may be joined together without the necessity of drilling holes or utilizing metallic rivets or bolts. The component which comprises the tines 20 is preferably made in a single unit, which is centrally apertured and which has three or more of the tines 20 radiating outward therefrom, each of which tines has sharpened teeth 26 thereon, which tines 20 are each reinforced with the respective ribs 30 and 32, so as to give resiliency and strength thereto. The pointed teeth 26 are preferably two or more in number on the end of each tine 20, which teeth 26 are curved upward, when the plug is in a flat position, as shown in FIG. 4, with respect to the thermo-rivets 22 on one side of the assembly, which is designated generally at 21. On the opposite side of the tine component, from the thermo-rivets 22, are projections 34, which are preferably four in number and which are adapted to register with holes 38 so that the outwardly extending serrations 40 and 42, of the plastic, disc-like members 10 and 12 will be in over-lapping position when assembled with the other components of the bridge plug, as shown in FIG. 5. Since the holes are not symmetrically spaced with respect to the circumference, it is possible for the serrated discs 10 and 12 to be made from an identical mold, but when these discs are assembled, a different set of four holes in one disc will fit over the thermo-rivets or projections 34, than the set of four holes in the complementary disc.

The openings between the serrations of the respective discs 10 and 12 are of such width that the serrations 40 and 42 will over-lap, when the discs are assembled, as shown in FIG. 5, however, the notches or openings 44 will permit the outwardly extending serrations 40 and 42 to move upward, without overlapping the respective disc-portions as shown in FIGS. 1 and 7, so as to form a substantially fluid tight container in the bore hole. The bore holes in which the present plug can be used range in size, from almost full size of the flattened discs to less than half the diameter thereof. Therefore, with 8½ inch diameter disc-like members in flattened condition, as shown in FIG. 5, a 7 inch hole will be readily closed by the plug, or a 4½ inch hole may be just as effectively and efficiently closed thereby.

The central portion of each disc 10 and 12 is cross slitted, as indicated at 14, FIG. 8, which slits, for purposes of illustration, are shown with the edges spaced apart, however, in actual practice, the adjacent edges of these slits are substantially in abutting relation, and when the holes 38 are so spaced and placed on projections 34 that the slits will occupy the arrangement as shown in FIG. 5, in full and dotted outline, the discs will form a substantially fluid tight retainer for bridging material, but will at the same time, permit the insertion of and removal of spear 8, for setting the bridge 2, without injury to the plastic component elements.

With the holes 38 aligned with projections 34, and with the slits 14 arranged as shown in FIG. 5, in full and in dotted outline, the serrated discs 10 and 12 are fitted onto the projections 34 and thermo-riveted in place, as will best be seen in FIG. 1.

Having thus clearly shown and described the invention, what is claimed as new and desired to be secured by Letters Patent is:

1. A bridge plug for the bore hole of a well, which bridge plug comprises;
   (a) superposed flexible discs which are capable of being deformed,
      (1) each flexible disc being slitted from the periphery a spaced distance toward the center,
      (2) said superposed discs being so arranged that the slits of said discs alternate so as to present a substantially imperforate disc-like member when in undeformed condition,
      (3) each said flexible disc being centrally apertured,
      (4) a multiplicity of toothed, outwardly extending, deformable tines secured to one said flexible disc and being arranged to surround said central aperture.

2. A bridge plug for the bore hole of a well as defined in claim 1; wherein
   (a) said tines are formed as an integral unit so as to have the central opening therein to surround said central aperture of the respective flexible superposed discs.

3. A bridge plug for the bore hole of a well as defined in claim 1; wherein
   (a) the teeth of said toothed tines are contoured to engage the wall of the bore hole of a well, when said deformable tines are in unrestrained position.

4. A bridge plug for the bore hole of a well as defined in claim 2; wherein
   (a) said integral unit forming said tines being resilient and flexible, but with a lesser degree of flexibility than said flexible discs,
   (b) each outwardly extending toothed tine having a flexible, apertured tine limiting and tine restraining lug secured thereto near the outer extremity thereof,
      (1) said apertured lugs being secured to the side of the respective tines opposite said flexible disc with which said tine unit is associated.

5. A bridge plug for the bore hole of a well as defined in claim 1; wherein
   (a) said outwardly extending tines have the teeth thereof curved toward the plane which said flexible discs normally occupy,
   (b) the flexible, apertured lug secured to each tine extends beyond the teeth of said tine, and is secured to the side of the tine opposite the curve of the teeth thereof,
      (1) the aperture of each outwardly extending lug being comparatively large to receive a loading spear,
      (2) the central aperture of each flexible disc being slitted, so as to receive the loading spear, but when the bridge plug is positioned in the well and the loading spear removed, the slitted central aperture will regain its normally planar position, (3) upon release from the loading spear, the tines will expand so that the teeth thereof engage the wall of the bore hole to hold said bridge plug within the bore hole to receive fill material, an explosive charge, or other use for which the bridge plug is adapted.

6. A bridge plug for the bore hole of a well as defined in claim 5; wherein
(a) said bridge plug is of drillable material, so the bore hole may be reopened.

7. A bridge plug for the bore hole of a well as defined in claim 5; wherein
(a) said flexible discs are formed of a flexible, deformable plastic.

8. A bridge plug for the bore hole of a well as defined in claim 5; wherein
(a) said tine unit is formed of formable, resilient plastic material.

9. A bridge plug for the bore hole of a well as defined in claim 1; wherein
(a) said central apertures in said discs being radial slits,
(b) the radial slits of one of said discs being out of register with radial slits in the other of said discs.

10. A bridge plug for the bore hole of a well as defined in claim 8; wherein
(a) said tine unit has outwardly extending, plastic projections thereon,
(1) said flexible discs having apertures formed therein a spaced distance from the centers thereof,
(2) said projections extending through certain of said apertures in said discs, and
(3) said projections being deformable by heat to bindingly secure said tine unit and said flexible discs in integral relation.

No references cited.

JAMES A. LEPPINK, *Primary Examiner.*